Oct. 6, 1942.   R. HINKLE   2,297,700
SIFTING APPARATUS
Filed June 21, 1939   3 Sheets-Sheet 1

INVENTOR
RAYMOND HINKLE
BY
ATTORNEYS

Oct. 6, 1942.  R. HINKLE  2,297,700
SIFTING APPARATUS
Filed June 21, 1939   3 Sheets-Sheet 2

INVENTOR
RAYMOND HINKLE
BY
ATTORNEYS

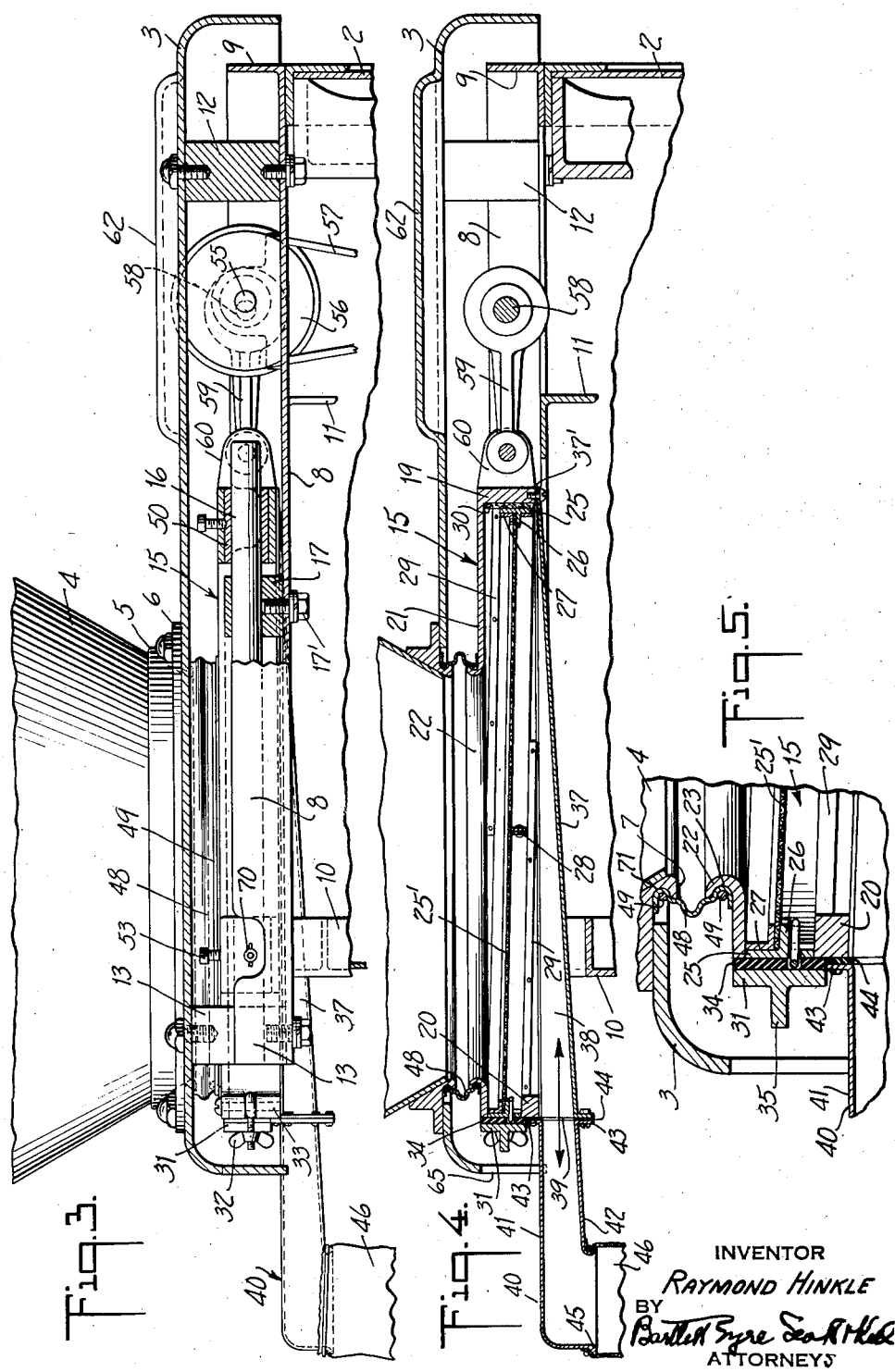

Patented Oct. 6, 1942

2,297,700

UNITED STATES PATENT OFFICE 2,297,700

SIFTING APPARATUS

Raymond Hinkle, Hanover, Pa.

Application June 21, 1939, Serial No. 280,229

7 Claims. (Cl. 209—240)

This invention relates to sifting apparatus for flour, sugar, dried milk, and other similar materials which are to be cleansed of foreign matter, etc.

The invention relates particularly to high speed oscillating or reciprocating sifter units, and one object of the invention is a novel and improved unit of this character which is characterized by its compactness, by its adaptability to the use of screens of any desired area and capacity without appreciable increase in height, by the effective prevention of the escape of the materials being sifted into the atmosphere or into contact with the bearings and driving mechanisms, by the facility with which the sieve or sieves may be removed for cleansing or replacement, by the facility with which the sifted material is advanced and discharged at convenient points for disposal, by the simplicity and ruggedness of the structure, and by the low cost of manufacture.

Further objects of the invention will hereinafter appear.

For a better understanding of the invention reference may be had to the accompanying drawings forming a part of this application wherein—

Fig. 3 is a sectional view along the line 3—3 of Fig. 2;

Fig. 4 is a sectional view along the line 4—4 of Fig. 2;

Fig. 5 is an enlarged sectional view of a part of the structure corresponding to Fig. 4;

Fig. 6 is a sectional view along the line 6—6 of Fig. 2;

Fig. 7 is a perspective view of the reciprocating sifting unit;

Fig. 8 is a perspective view on an enlarged scale of one of the bearing structures; and Fig. 9 is a sectional view of another embodiment of the invention.

Figure 1:
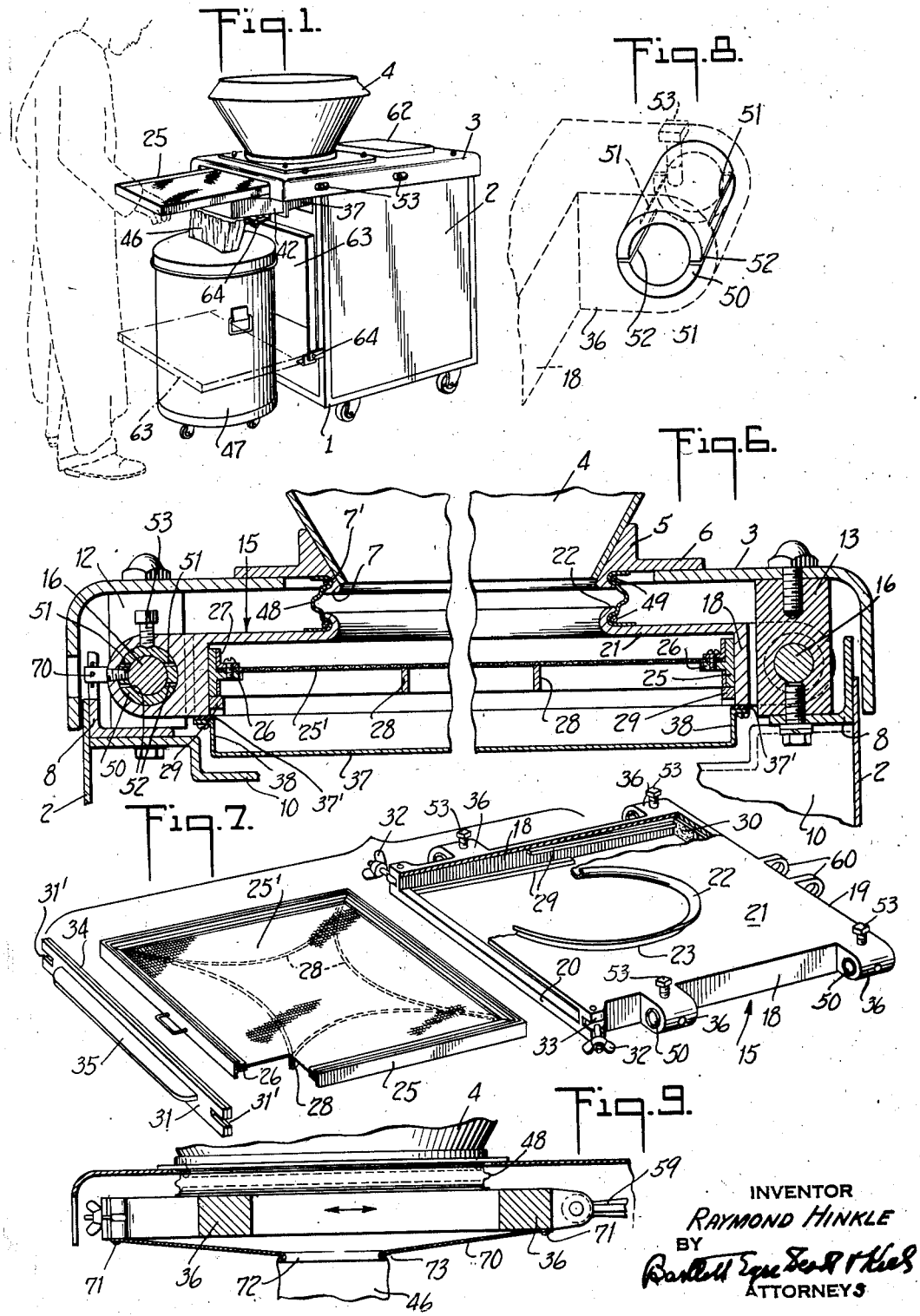
Fig. 1 is a perspective view of one embodiment of the invention.
Figure 2:
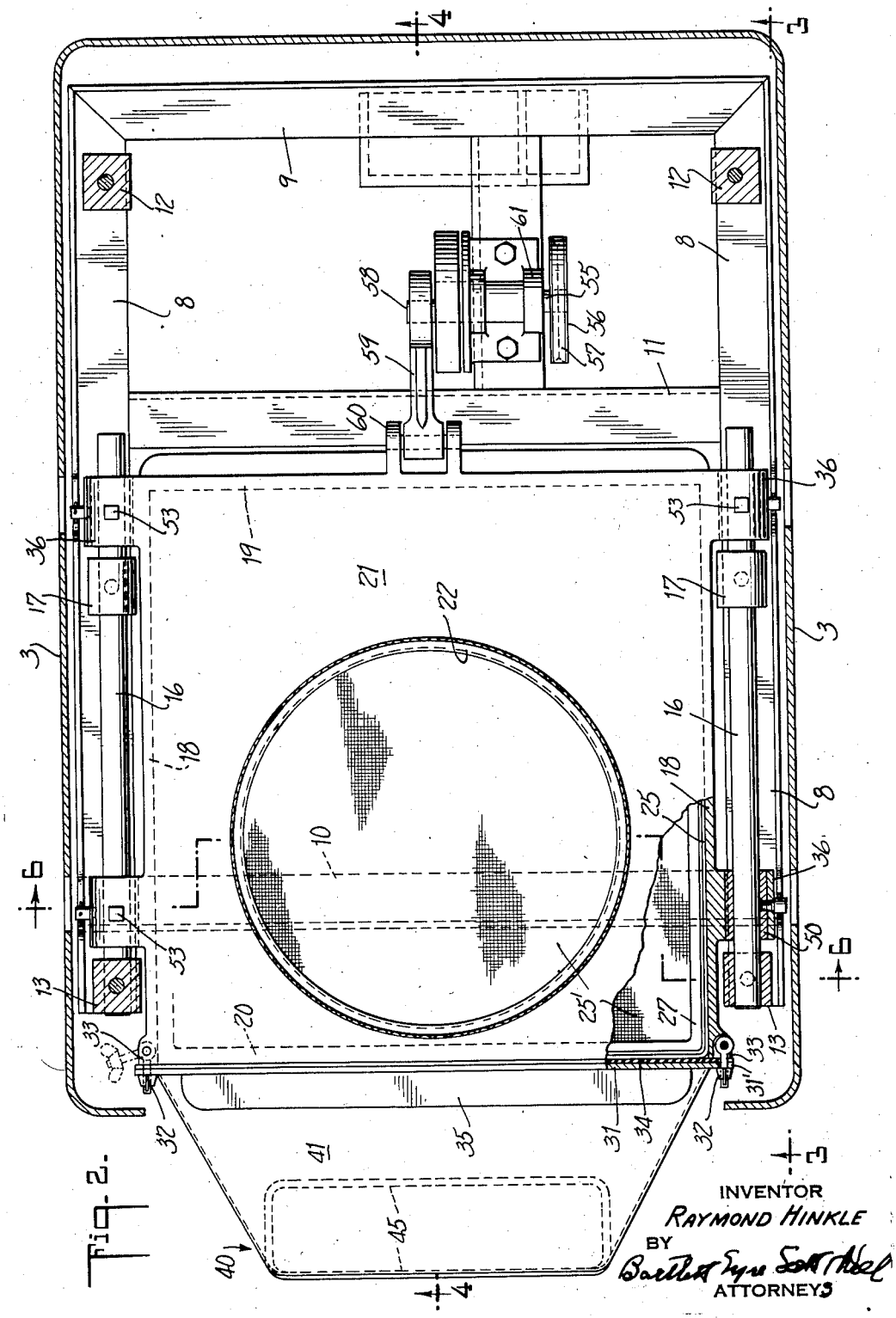
Fig. 2 is a plan view with certain parts in section and broken away.

Referring to the modification of Fig. 1 of the drawings I have illustrated my invention as embodied in a portable unit embodying a frame 1, with side closing walls 2 and a cover 3. The cover 3 carries a hopper 4, the latter embodying an annular support 5 having a flange 6 resting upon the cover 3 and a mouth or dump outlet 7 projecting downwardly through an opening formed in the cover 3.

The main frame 1 supports on the top thereof an auxiliary frame comprising L-shaped side members 8, an end L member 9, an opposite end L member 10 and an intermediate L member 11. This latter frame in turn supports a cover 3 by means of a pair of studs 12 at one end and a pair of studs 13 at the other end, these studs being fastened to the frame and to the cover by the bolts indicated. Underneath the cover 3 and above the frame is disposed a sifting unit 15. This unit is mounted for oscillating or reciprocating movement on a pair of side shafts 16, these shafts being supported on one end by the studs 13 and at their other ends by a pair of studs 17, the latter being fastened to the frame by the bolts 17' and these bolts 17' together with the bolts fastening the studs 13 being screwed home to hold the shafts 16 in fixed position on the frame.

The sifting unit 15 comprises a main rectangular casting having side members 18, a rear end member 19, a front end member 20 and a cover 21. The cover 21 is provided with an opening with an upwardly extending rim 22, the latter having formed therein a groove 23 for a purpose hereinafter described. An opening or door is formed between the front member 20 of the casting and the cover 21 for the reception of a sieve element, only one sieve being shown for convenience in illustration, but it being understood that two or more superposed sieves may be employed if deemed advisable. This sieve element comprises a rectangular frame 25 carrying the sieve or sieves 25' therein, the latter resting on a flange 26 projecting inwardly of the frame 25 and the sieve being fastened thereto by means of the L members 27 and the screw bolts indicated. The sieve is supported underneath and intermediate its edges by the curved metallic members or bars 28, the latter being secured in any suitable manner to the frame 25, as by rivets. The sieve element may be slid into and outwardly through the door between the casting member 20 and the cover 21 and in order to guide the sieve in the insertion and removal of the same from the casting vertically spaced overlapping guide members 29 are fastened on either side of the casting against the side members 18 thereof. In order to seal the sieve tightly against the rear wall 19 of the casting a layer of sponge rubber or the like 30 is provided therefor. The sieve is sealed at its forward edge against leakage by means of a closing end plate 31 which fits tightly against the end casting member 20 and the corresponding coplanar edge of the cover 21 and is kept in tight engagement therewith by means of wing nuts 32, the latter being pivotally fastened to lugs 33 which are cast as a part of the casting. The nuts are adapted to be swung around in the plane of the casting into slots 31' formed in the ends of the end plate 31. A layer of rubber 34 or the like is disposed between the end plate 31 and the casting members 20 and 21 to form an effective seal against leakage. Seals of felt, rubber or the like may be also provided on the sides of the sieve frame 25 but the guides 29 ordinarily provide a sufficient seal between the upper and lower chambers. The end plate 31 is provided with an elongated flange member 35 for strengthening the same and for facilitating the handling of the end plate.

The casting has attached to the rear member 19 and the side members 18 thereof in a sealed manner a bottom 37, being sealed by felt or the like 37' the latter having side walls 38 of gradually increasing depth forwardly of the unit so as to form an opening 39 at the forward end adjacent the front edge of the casting member 20 and to form a forward downward slant of the bottom 37. The side guide members 29 for the sieve are mounted so as to have a rearward downward slant, namely, the reverse of the slant of the bottom 37 of the sieve unit, which is the preferred construction, although certain of the advantages of the invention are attained with a horizontal disposition of the sieve 25'. The cross frame member 19 has a drop intermediate the ends thereof to accommodate the downward slant of the bottom 37 of the unit as the unit is reciprocated back and forth. The reciprocating sieve unit also comprises a forwardly projecting outlet 40 having an upper wall 41 and a lower wall 42, being integrally formed with side walls as, for example, of sheet metal, and both being provided with flanges 43 for attachment by the bolts indicated to the casting member 20 and a similar flange formed on the bottom 37. A sealing means, as of rubber 44, is disposed in this fastening to seal the inner part of the sifting unit effectively against the escape of flour, etc. This outlet 40 is of the shallow depth and tapering width indicated and the lower wall 42 thereof forms a continuation of the slight slant of the bottom wall 37. This outlet is formed with a downwardly turned mouth having a rim 45 thereabout for the attachment of a suitable flexible skirt 46 leading into a receptacle 47.

The opening in the cover of the sifting unit 15 is provided, as indicated above, with a rim and a groove 23, this rim and groove co-operating with the rim 7 and similar groove 7' formed therein to receive a flexible skirt 48, the latter being attached thereto by the spring rings 49 and being thereby effectively sealed against the escape of flour, dust and the like. The flexible skirts 46 and 48 may be formed of any suitable material as, for example, chamois, rubber, canvas and the like.

The sieve unit casting is formed on either side with lugs 36 containing bronze bearings for sliding or reciprocating movement longitudinally of the shafts 16. Each of the lugs 36 is provided with an inserted split sleeve bronze bearing 50 of the construction indicated in Fig. 8. These bearing sleeves are thus provided on one end with a pair of co-planar slots 51, these slots being provided on the opposite sides of the sleeves. A second pair of slots 52 being angularly spaced from the slots 51 are formed in the sleeve and these pairs of slots 51 and 52 overlap each other as indicated. Each bearing lug 36 is provided with a screw bolt 53 passing therethrough and engaging the bearing sleeve 50, the bearing 50 being provided with a recess for the reception of the screw bolt. These bolts retain the bearing sleeves 50 in fixed relation to the reciprocating sieve unit and through the slot construction described makes it possible to take up for wear of the sleeves by simply tightening these bolts.

The sieve unit may be reciprocated or agitated in any suitable manner and for this purpose I have illustrated in the drawings a drive shaft 55 suitably mounted on the frame together with a pulley 56 driven as by the belt 57 shown from any suitable motor device. The shaft also carries an ecentric 58 having an eccentric arm 59 pivotally conected with a pair of lugs 60 cast onto the casting member 19. The shaft 55, as indicated, is mounted in a suitable bearing 61.

The cover 3 is provided with a slightly raised platform 62 for convenience in the support of a bag of flour or other material to be sifted which flour is to be dumped into the hopper 4. In Fig. 1 is also shown a portable receptacle 47 for receiving the sifted material from the shallow tapered receiving container 37, 42. I have also provided a pivoted platform 63 for the support of a receptacle for the sifted material. This platform 63 is pivotally mounted on the frame of the unit by the brackets 64 whereby it may be lowered to the position shown in dash and dotted lines for the support of a receptacle or may be elevated to the vertical position as shown in full lines out of the way of the portable receptacle 47. This platform 63 may be held in the vertical position by any suitable means, as for example the spring gauge 64 which is suitably fastened to the frame of the unit.

While I have shown the sifting unit 16 as mounted for reciprocation upon the guide shafts 16, it is understood that the unit may be mounted for agitation in any suitable manner, as for example by mounting the same upon four flat springs disposed generally at right angles to the unit 15, with the upper ends of the springs fastened to the lugs 36 while the lower ends of the springs are fastened to the frame; and, as indicated, other suitable mounts for agitation may be provided.

The operation is clear from the above description. Upon the dumping of a quantity of flour and the like into the hopper 4 and down upon the sieve 25', the latter being effectively supported by the curved supports 28 and upon driving the pulley 56 the whole sifting housing 15 is rapidly reciprocated in the direction of the inclination of the sieve 25' and of the bottom container 37, these being preferably oppositely inclined as described above. The sifted material is gradually advanced or walked down the inclined container or bottom 37 into the outlet 40. By the support of the sealed reciprocating housing upon the side shafts 16 which are entirely outside of and thus sealed from the interior of the sifting chamber housing, bearing lubrication is simplified as by means of conventional lubrication fittings 70 carried by the sleeve 50 and rendered readily accessible through openings 71 formed in the cover plate, and there is no possibility of grease or oil reaching the sifting chamber. Moreover, the escape of material to the bearings 50 or other mounting means is thereby prevented which avoids any possibility of contaminating or interfering with lubrication and freezing of the bearings. By the construction shown the sieve element 25 is readily removable for cleansing and replacement at one end of the casing 18 with the sieve movable into and from the casting housing disposed between and in the plane of the shafts which are disposed outside. For facilitating the removal of the sieve the cover 3 is provided with an opening 65 in the front end through which the wing nuts 32 may be readily engaged and released and the sieve unit 25 removed as indicated in Fig. 1. With the construction and arrangement shown in the above modification of the invention the materials are discharged at the end of the unit which has many advantages and conveniences as it is not necessary for the operator to stoop or do back strain lifting when removing containers as is the case where the materials are discharged between supporting legs, etc. Also this permits the discharge of the material into all types and shapes of containers which is not possible with the prior devices with which I am familiar. The utilization of the reciprocating action to advance the sifted materials to the discharge opening requires very little space, only a pan with a slope of one inch to twenty-four inches, thus permitting making the screen area of any dimensions necessary to increase the relative speed of sifting which only can be done by increasing the screen area. This is particularly important as compared with stationary casing devices wherein the materials slide from the screen and it is necessary to have a slope at an angle approaching 45° or more to break the angle of repose of the various materials to be sifted. The construction of my apparatus enables the whole unit to be of a height to be accommodated in limited spaces and yet obtain the large screen area desired and the high speed sifting capacity required. In my machine the whole of the sifted materials are automatically discharged from the receiving pan or container upon which they fall. By the construction of the reciprocating unit described the sieve is wedged firmly between two rubber surfaces by the pressure from the closing door plate, thus forming a leak-proof and dust-tight sifting compartment and sieve. There are no crevices or spaces through which leakage of sifted material may occur from the sifting unit to contaminate the air in the room or to creep into the reciprocating parts, the reciprocating mechanism being entirely outside of the sealed sifting compartment. Also an important feature of the invention is the split bearing construction 50 which enables adjustment from time to time to take up for wear between the stationary shafts and the reciprocating bearing 50.

In the embodiment of Fig. 9 provision is made for the central discharge of the sifted material through the bottom of the sifting unit 15. For this purpose a pan 70 having rectangular sides corresponding to the rectangular shape of the casting is firmly fastened and sealed to the casting at points indicated at 71. This pan is provided with a mouth 72 centrally disposed and having a flange 73 with a groove therearound for the reception of a flexible chute 46 leading into the receptacle (not shown). The bottom of the pan 70 is inclined downwardly towards the mouth 72 but only a slight inclination is needed since the sifted material is caused to advance to the outlet 72 by the rapid oscillating or reciprocating movements of the unit. Here, as described above in the modification of Fig. 1, an inclination of one inch to twenty-four inches is all that is needed to effectively cause the discharge of the sifted material irrespective of the screen area and capacity of the unit. In these constructions it is unnecessary to maintain a definite screen area relative to the opening of the receiver, container or receptacle, and with a unit of a given height for restricted spaces the screen area may be made of the capacity desired without necessitating any change in the slope or height of the exit pan.

I claim:

1. In a sifting apparatus of the character set forth, a frame, a hopper carried by said frame, a pair of spaced guide shaft elements carried by said frame, a reciprocating sifter housing unit comprising an upper cover part with an intake which is connected with said hopper by means of a flexible chute, a removable sifting element supported underneath said cover plate and dividing said housing into upper and lower chambers sealed against each other, said sifting element being slightly inclined, a pan member disposed underneath the sieve element and forming the bottom of said lower chamber, said pan having an outlet mouth with which a flexible chute is connected and having a slight inclination from the edges thereof to said outlet mouth, and side bearings for the housing unit disposed outside the sealed housing chambers and guided on said shafts, and means for applying to said housing a rapid reciprocating or oscillating movement upon said shafts in the direction of inclination of said sifting element.

2. In a sifting apparatus of the character set forth, a stationary hopper, a reciprocating sifter housing unit connected with said hopper through a flexible chute and having a sealed interior chamber, means for mounting said sifter housing on bearing guides disposed exteriorly of said sealed chamber, a sieve element sealed within but readily removable from said sealed housing chamber and having a slight inclination in the direction of reciprocation and a catching and walking pan fastened to the under side of said housing and likewise having a slight inclination in the direction of reciprocation, said pan having an outlet for the sifted material and means for reciprocating or oscillating said housing.

3. In a sifting apparatus of the character set forth, a frame, spaced guide elements carried by said frame, a reciprocating sifter unit comprising an upper cover part having an intake, a slightly inclined removable sifting element supported underneath said cover part and dividing said unit into upper and lower chambers, a slightly inclined pan member disposed underneath the sifting element and forming the bottom of said lower chamber, said pan having an outlet mouth, connections between the sifter unit and said guide elements disposed outside the said unit, and means mounted on said frame for applying to said unit a rapid reciprocating or oscillating movement upon said guide elements in the direction of inclination of said sifting element and of said pan.

4. In a sifting apparatus of the character set forth, a frame, a hopper carried by said frame, a pair of spaced guide shaft elements carried by said frame, a reciprocating sifter housing unit comprising an upper cover part with an intake which is connected with said hopper by means of a flexible chute, a removable sifting element supported underneath said cover plate and dividing said housing into upper and lower chambers sealed against each other, said sifting element being slightly inclined, a pan member disposed underneath the sieve element and forming the bottom of said lower chamber, said pan having an outlet mouth with which a flexible chute is connected and having a slight inclination from the edges thereof to said outlet mouth, and side bearings for the housing unit disposed outside the sealed housing chambers and guided on said shafts, and means for applying to said housing a rapid reciprocating or oscillating movement upon said shafts in the direction of inclination of said sifting element, the pan having a tapered extension projecting beyond said frame and forming said outlet mouth, said pan being slightly downwardly inclined from the rearward end to the front end thereof and said guide shafts extending from front to rear of said casing, whereby reciprocation of the housing advances sifted material down said pan toward the outlet mouth.

5. In a sifting apparatus of the character set forth, a frame, a hopper carried by said frame, a pair of spaced guide shaft elements carried by said frame, a reciprocating sifter housing unit comprising an upper cover part with an intake which is connected with said hopper by means of a flexible chute, a removable sifting element supported underneath said cover plate and dividing said housing into upper and lower chambers sealed against each other, said sifting element being slightly inclined, a pan member disposed underneath the sieve element and forming the bottom of said lower chamber, said pan having an outlet mouth with which a flexible chute is connected and having a slight inclination from the edges thereof to said outlet mouth, and side bearings for the housing unit disposed outside the sealed housing chambers and guided on said shafts, and means for applying to said housing a rapid reciprocating or oscillating movement upon said shafts in the direction of inclination of said sifting element, the outlet of the pan being centrally disposed with respect to the housing unit.

6. In a sifting apparatus of the character set forth, a sealed sifting unit mounted for reciprocation on guide parallel shafts disposed wholly exteriorly of the unit and a removable sieve element which is inclined to the axes of the shafts, said sifter unit including a bottom pan which is inclined in the opposite direction to the inclination of the sieve whereby reciprocation of said unit on said shafts walks material down said sieve element and said pan.

7. In a sifting apparatus of the character set forth, a sealed sifter housing unit having projecting lugs, guide shaft means extending through said lugs for supporting said unit and bearing sleeves about said shaft means and within said lugs having overlapping slots formed on the ends together with means extending through said lugs for tightening up on said slotted sleeves whereby adjustment of said housing unit on said shaft means may be effected exteriorly of said unit.

RAYMOND HINKLE.